US008073402B2

(12) United States Patent
Law

(10) Patent No.: US 8,073,402 B2
(45) Date of Patent: Dec. 6, 2011

(54) WIRELESS INTERCOMMUNICATIVE ALARM DOORBELL

(75) Inventor: Bing Hung Law, Sheung Wan (HK)

(73) Assignee: World Enterprise Sino Ltd, Sheung Wan (HK)

( * ) Notice: Subject to any disclaimer, the term of this patent is extended or adjusted under 35 U.S.C. 154(b) by 505 days.

(21) Appl. No.: 12/343,442

(22) Filed: Dec. 23, 2008

(65) Prior Publication Data

US 2010/0112963 A1 May 6, 2010

(30) Foreign Application Priority Data

Oct. 31, 2008 (HK) .................................... 08111997

(51) Int. Cl.
*H04B 1/38* (2006.01)

(52) U.S. Cl. ....................................... 455/90.1; 340/328

(58) Field of Classification Search ................. 455/90.1, 455/39, 41.2, 66.1; 340/692, 328, 326, 517, 340/521, 538, 539, 392.1, 531
See application file for complete search history.

(56) References Cited

U.S. PATENT DOCUMENTS

2004/0095254 A1 * 5/2004 Maruszczak .................. 340/692

* cited by examiner

*Primary Examiner* — Joseph Lauture

(57) ABSTRACT

A wireless intercommunicative alarm doorbell comprising an outdoor bell and an indoor bell; the outdoor bell comprises an outdoor bell casing, an outdoor bell power supply, an outdoor bell loudspeaker, an outdoor bell microphone, an outdoor bell talk button, an outdoor bell antenna, an outdoor bell wireless transmitting and receiving integrated circuit, a door ring button and a door ring integrated circuit; the indoor bell comprises an indoor bell casing, an indoor bell power supply, an indoor bell loudspeaker, an indoor bell microphone, an indoor bell talk button, an indoor bell antenna, an indoor bell wireless transmitting and receiving integrated circuit and a door ring integrated circuit; the indoor bell further comprises an alarm button. The present invention provides an alarm which is easy for the person indoor to operate and can effectively call for attention on the basis of a wireless intercommunicative doorbell. It provides the solution of a single wireless intercommunicative alarm doorbell with the dual functions.

10 Claims, 8 Drawing Sheets

WIRELESS INTERCOMMUNICATIVE ALARM DOORBELL

BACKGROUND OF THE INVENTION

The present invention relates to a wireless intercommunicative doorbell and more particularly pertains to a doorbell having the dual functions of wireless intercommunication and alarming.

A typical wireless intercommunicative doorbell system in the marketplace generally comprises an outdoor bell located outdoor and an inner doorbell located indoor, each outdoor or indoor bell is disposed with a wireless transmitting and receiving device. When a visitor presses the doorbell, the outdoor bell transmits wireless signals instructing the indoor bell to ring, so as to inform the persons indoor that there is a visitor at the door. Besides, such a wireless intercommunicative doorbell also provides an intercommunicative function. When a person indoor knows that there is a visitor at the door, he can press the “Talk” button on the indoor bell and speak into the microphone on the indoor bell so as to communicate with the visitor outdoor ascertaining the visitor’s identity and purpose of the visit. After the indoor bell microphone receives the audio signals, the audio signals are then transmitted to the outdoor bell outside by the wireless transmitting and receiving device which is disposed inside the indoor bell, and then the audio signals are played by a loudspeaker which is disposed inside the outdoor bell. Similarly, the visitor can also press the “Talk” button on the outdoor bell, and speak into the microphone on the outdoor bell so as to communicate with the person indoor. After the outdoor bell microphone receives the audio signals, the audio signals are then transmitted to the indoor bell inside by the wireless transmitting and receiving device which is disposed inside the outdoor bell, and then the audio signals are played by a loudspeaker which is disposed inside the indoor bell.

However, the wireless intercommunicative doorbells in the art generally do not comprise any alarming system. In case the person indoor has an accident, he has to call the police or his relatives or friends for help. In case of a critical situation, the person indoor may not be able to make the call for help. Therefore, the prior art does not provide an alarming system which is easy for the person indoor to operate and can effectively call for attention.

BRIEF SUMMARY OF THE INVENTION

In view of the aforesaid disadvantages now present in the prior art, the object of the present invention is to provide an alarm which is easy for the person indoor to operate and can effectively call for attention on the basis of a wireless intercommunicative doorbell. It provides the solution of a single wireless intercommunicative alarm doorbell with the dual functions.

To attain this, the present invention adopts the following technical proposals:

A wireless intercommunicative alarm doorbell comprising an outdoor bell and an indoor bell;

the outdoor bell comprises an outdoor bell casing, an outdoor bell power supply, an outdoor bell loudspeaker, an outdoor bell microphone, an outdoor bell talk button, an outdoor bell antenna, an outdoor bell wireless transmitting and receiving integrated circuit, a door ring button and a door ring integrated circuit;

the outdoor bell wireless transmitting and receiving integrated circuit electrically connects with the outdoor bell power supply, the outdoor bell loudspeaker, the outdoor bell microphone, the outdoor bell talk button, the outdoor bell antenna, the door ring button and the door ring integrated circuit;

the indoor bell comprises an indoor bell casing, an indoor bell power supply, an indoor bell loudspeaker, an indoor bell microphone, an indoor bell talk button, an indoor bell antenna, an indoor bell wireless transmitting and receiving integrated circuit and a door ring integrated circuit;

the indoor bell wireless transmitting and receiving integrated circuit electrically connects with the indoor bell power supply, the indoor bell loudspeaker, the indoor bell microphone, the indoor bell talk button, the indoor bell antenna and the door ring integrated circuit;

when the outdoor bell talk button or the door ring button of the outdoor bell is pressed, the outdoor bell wireless transmitting and receiving integrated circuit modulates the signals received by the outdoor bell microphone or the door ring signals generated by the door ring integrated circuit of the outdoor bell, and the signals are then transmitted by the outdoor bell antenna, the indoor bell wireless transmitting and receiving integrated circuit receives and decodes the signals transmitted by the outdoor bell antenna via the indoor bell antenna, and the decoded signals are outputted via the indoor bell loudspeaker;

when the indoor bell talk button is pressed, the indoor bell wireless transmitting and receiving integrated circuit modulates the signals received by the indoor bell microphone and the signals are then transmitted by the indoor bell antenna, the outdoor bell wireless transmitting and receiving integrated circuit receives and decodes the signals transmitted by the indoor bell antenna via the outdoor bell antenna, and the decoded signals are outputted via the outdoor bell loudspeaker;

wherein the indoor bell further comprises an alarm button, the alarm button electrically connects with the indoor bell wireless transmitting and receiving integrated circuit and the door ring integrated circuit of the indoor bell; when the alarm button is pressed, the indoor bell wireless transmitting and receiving integrated circuit modulates the door ring signals generated by the door ring integrated circuit of the indoor bell and then transmits an alarming signal by the indoor bell antenna, the outdoor bell wireless transmitting and receiving integrated circuit receives the alarming signal via the outdoor bell antenna and then drives the outdoor bell loudspeaker to ring a preset alarm.

The model numbers of the outdoor bell wireless transmitting and receiving integrated circuit and the indoor bell wireless transmitting and receiving integrated circuit are each CRF16B. The model numbers of the door ring integrated circuits of the outdoor bell and the indoor bell are each MX3920.

The outdoor bell further comprises an outdoor first channel set button and an outdoor second channel set button, the outdoor first channel set button and the outdoor second channel set button electrically connects with the outdoor bell wireless transmitting and receiving integrated circuit, the outdoor bell wireless transmitting and receiving integrated circuit adjusts the frequency range for receiving and transmitting signals according to the on/off combination of the outdoor first channel set button and the outdoor second channel set button; correspondingly, the indoor bell further comprises an indoor first channel set button and an indoor second channel set button, the indoor first channel set button and the indoor second channel set button electrically connects with the indoor bell wireless transmitting and receiving integrated circuit, the indoor bell wireless transmitting and receiving integrated circuit adjusts the frequency range for receiving and transmitting signals according to the on/off combination of the indoor first channel set button and the indoor second channel set button.

The outdoor bell further comprises an outdoor bell power supply low voltage indicating light and a power supply low voltage detecting circuit, the indoor bell further comprises an indoor bell power supply low voltage indicating light and a power supply low voltage detecting circuit. When the power supply low voltage detecting circuit of the outdoor bell detects that the voltage drops to a predetermined level, the outdoor bell power supply low voltage indicating light gives light reminding the user to change the batteries. When the power supply low voltage detecting circuit of the indoor bell detects that the voltage drops to a predetermined level, the indoor bell power supply low voltage indicating light gives light reminding the user to change the batteries.

The outdoor bell further comprises an outdoor bell operation indicating light; the indoor bell further comprises an indoor bell operation indicating light. When the outdoor bell talk button is being pressed, the outdoor bell operation indicating light keeps on giving light; when the door bell is pressed for one time, the outdoor bell operation indicating light flashes once or more. When the indoor bell talk button is being pressed, the indoor bell operation indicating light keeps on giving light; when the alarm button is pressed once while the indoor bell operation indicating light keeps on giving light, the indoor bell operation indicating light stops giving light.

The outdoor bell further comprises a power switch, the indoor bell further comprises a power switch. When the outdoor bell is in operation, the power switch is adjusted to an "ON" position, when the outdoor bell is not in operation, the power switch is adjusted to an "OFF" position. When the indoor bell is in operation, the power switch is adjusted to an "ON" position, when the indoor bell is not in operation, the power switch is adjusted to an "OFF" position. The outdoor bell power supply and the indoor bell power supply are each two 2A batteries respectively.

DETAILED DESCRIPTION OF THE INVENTION

The preferred embodiments of the present invention are further described in detail with the following embodiment and the accompanying drawings.

Figure 1:
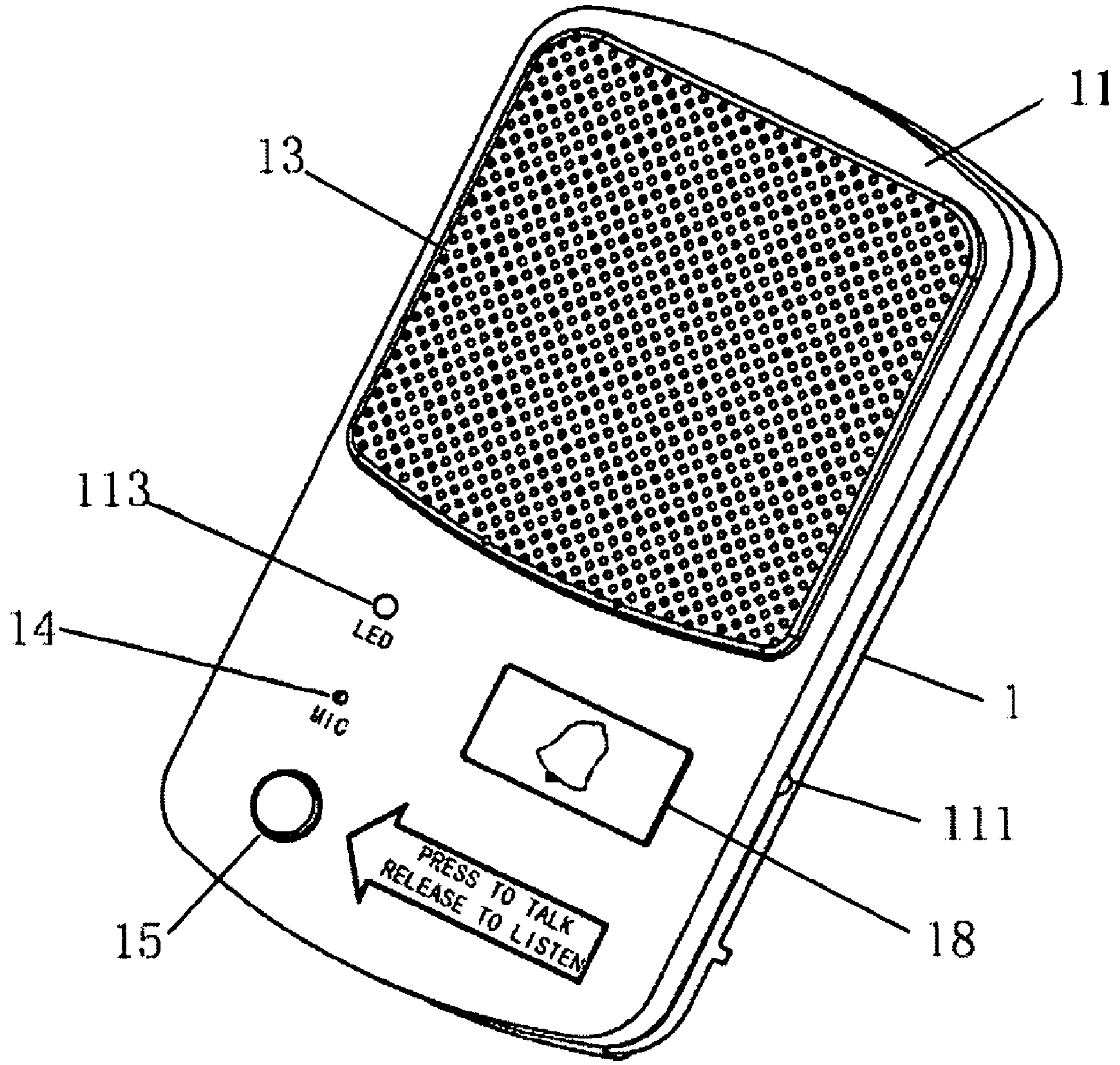
FIG. 1 is a perspective view of the outdoor bell of the present invention.
Figure 2:
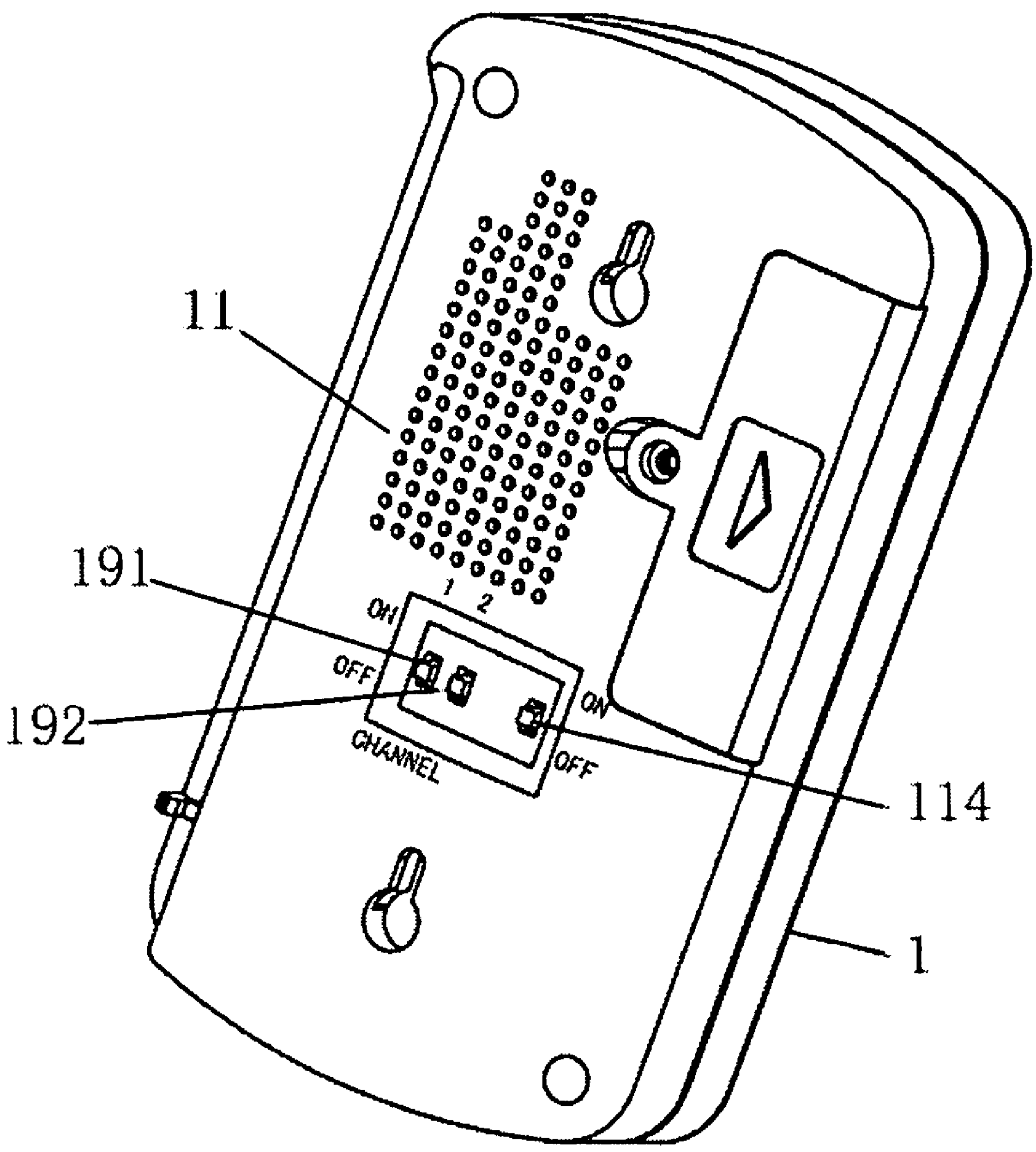
FIG. 2 is another perspective view of the outdoor bell of the present invention.
Figure 3A:
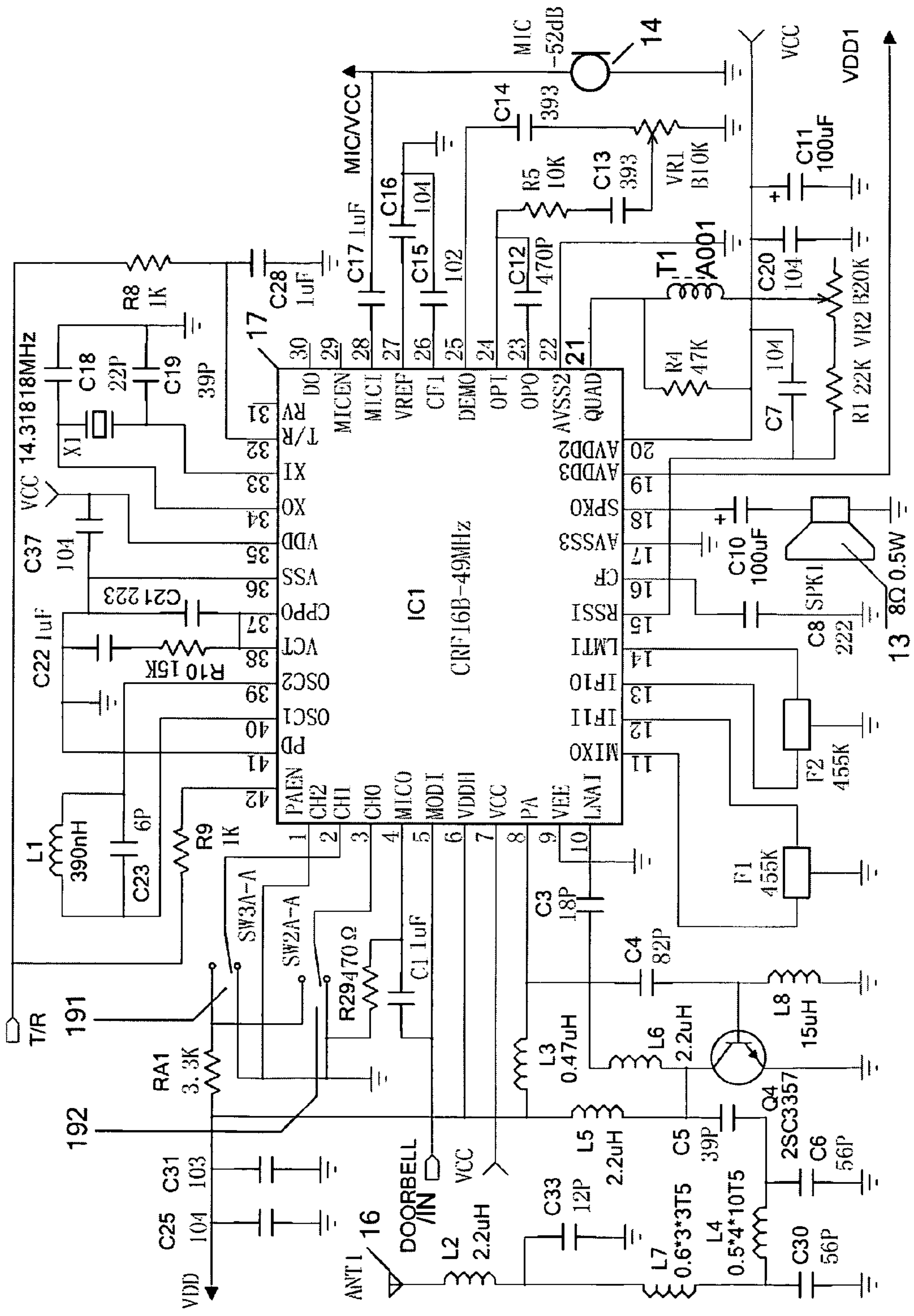
FIG. 3 is a circuit diagram of the outdoor bell of the present invention.
Figure 3B:
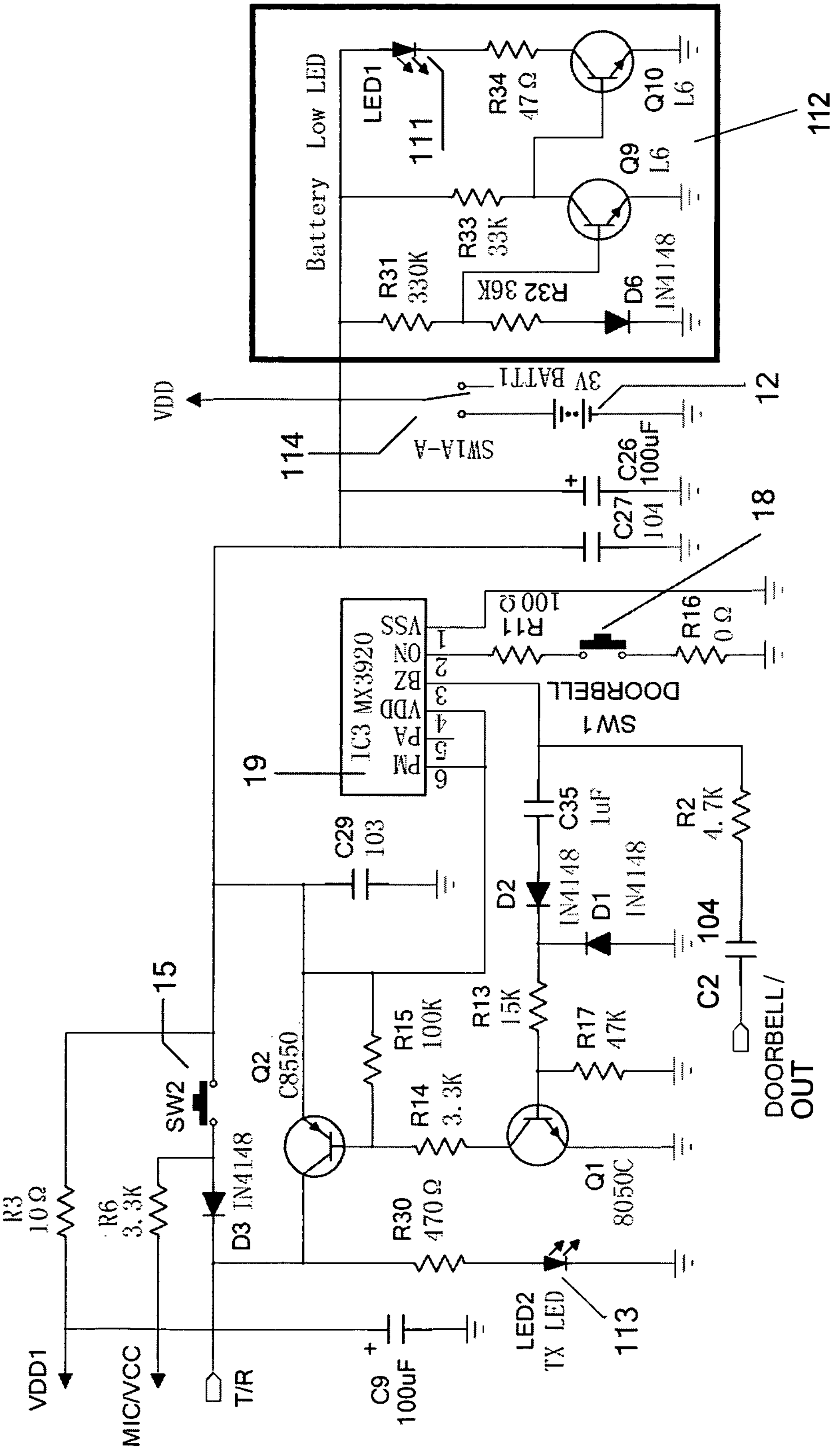

FIGS. 1 to 6 illustrate the embodiment of the present invention. As shown in FIGS. 1 to 6, a wireless intercommunicative alarm doorbell comprising an outdoor bell 1 and an indoor bell 2. As shown in FIGS. 1 to 3, the outdoor bell 1 comprises an outdoor bell casing 11, an outdoor bell power supply 12, an outdoor bell loudspeaker 13, an outdoor bell microphone 14, an outdoor bell talk button 15, an outdoor bell antenna 16, an outdoor bell wireless transmitting and receiving integrated circuit 17, a door ring button 18 and a door ring integrated circuit 19. The outdoor bell wireless transmitting and receiving integrated circuit 17 electrically connects with the outdoor bell power supply 12, the outdoor bell loudspeaker 13, the outdoor bell microphone 14, the outdoor bell talk button 15, the outdoor bell antenna 16, the door ring button 18 and the door ring integrated circuit 19. The outdoor bell 1 further comprises an outdoor bell operation indicating light 113 and a power switch 114. The outdoor bell 1 further comprises an outdoor first channel set button 191 and an outdoor second channel set button 192. The outdoor first channel set button 191 and the outdoor second channel set button 192 electrically connects with the outdoor bell wireless transmitting and receiving integrated circuit 17. The outdoor bell wireless transmitting and receiving integrated circuit 17 adjusts the frequency range for receiving and transmitting signals according to the on/off combination of the outdoor first channel set button 191 and the outdoor second channel set button 192.

Figure 4:
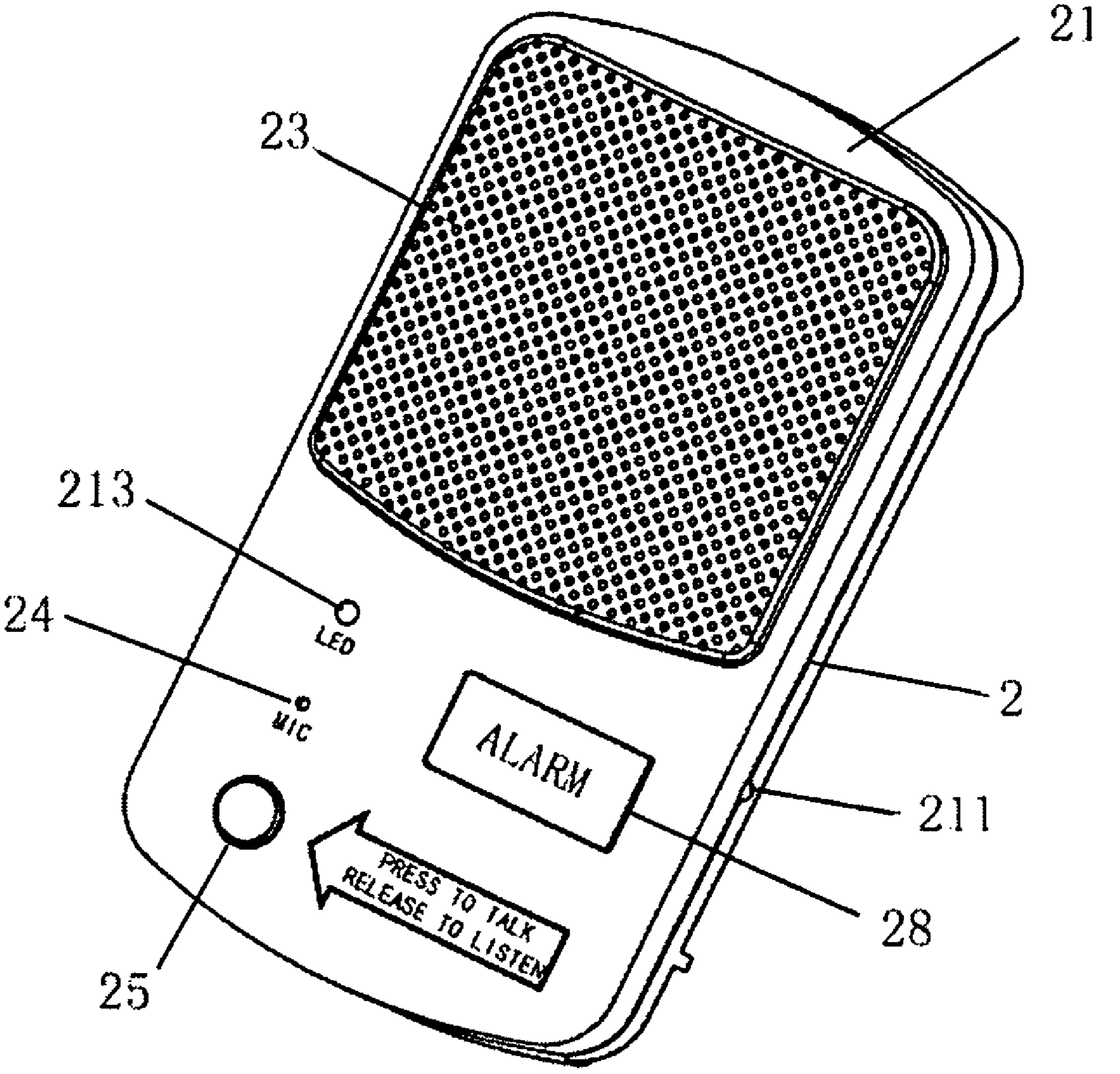
FIG. 4 is a perspective view of the indoor bell of the present invention.
Figure 5:
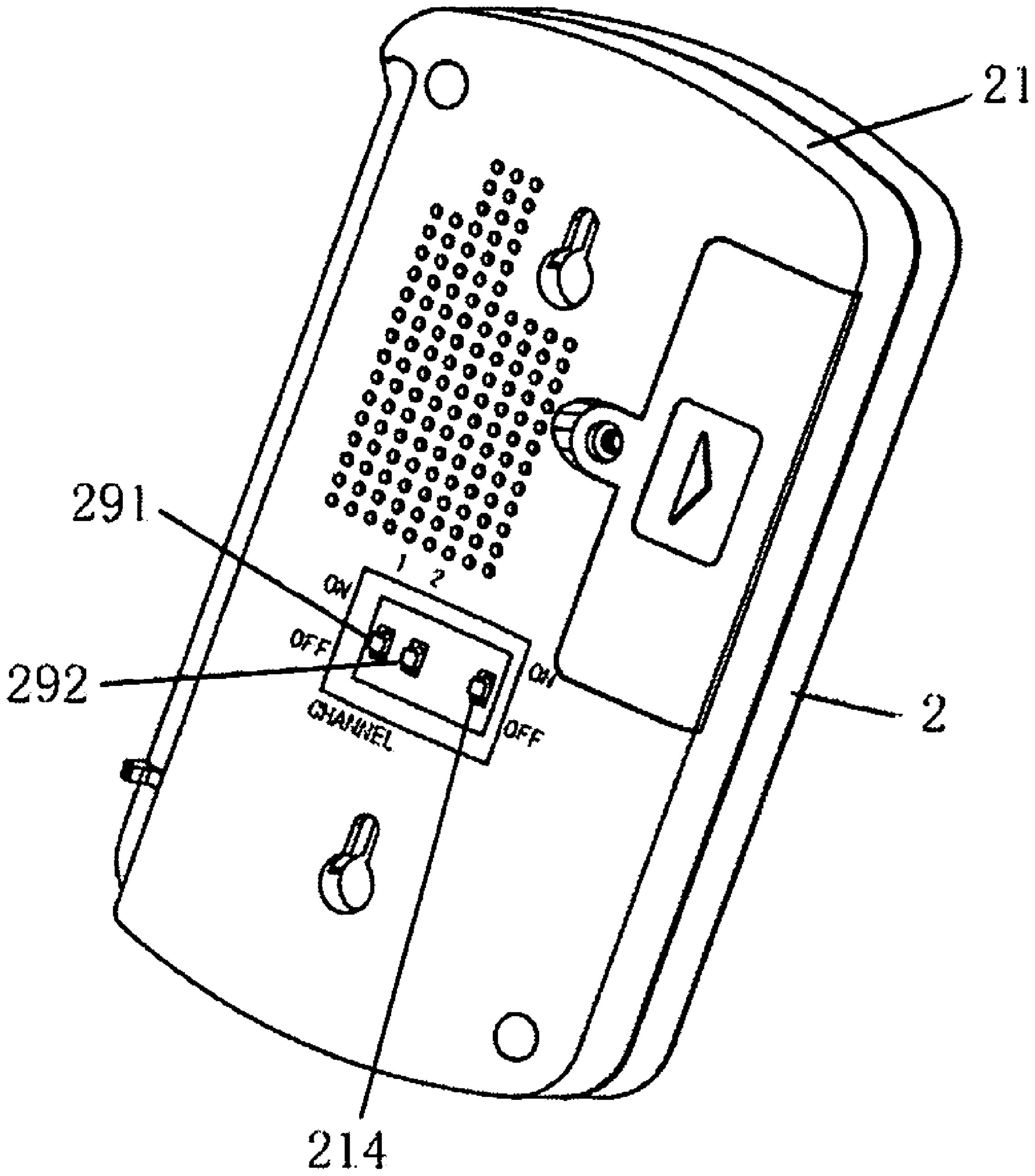
FIG. 5 is another perspective view of the indoor bell of the present invention.
Figure 6A:
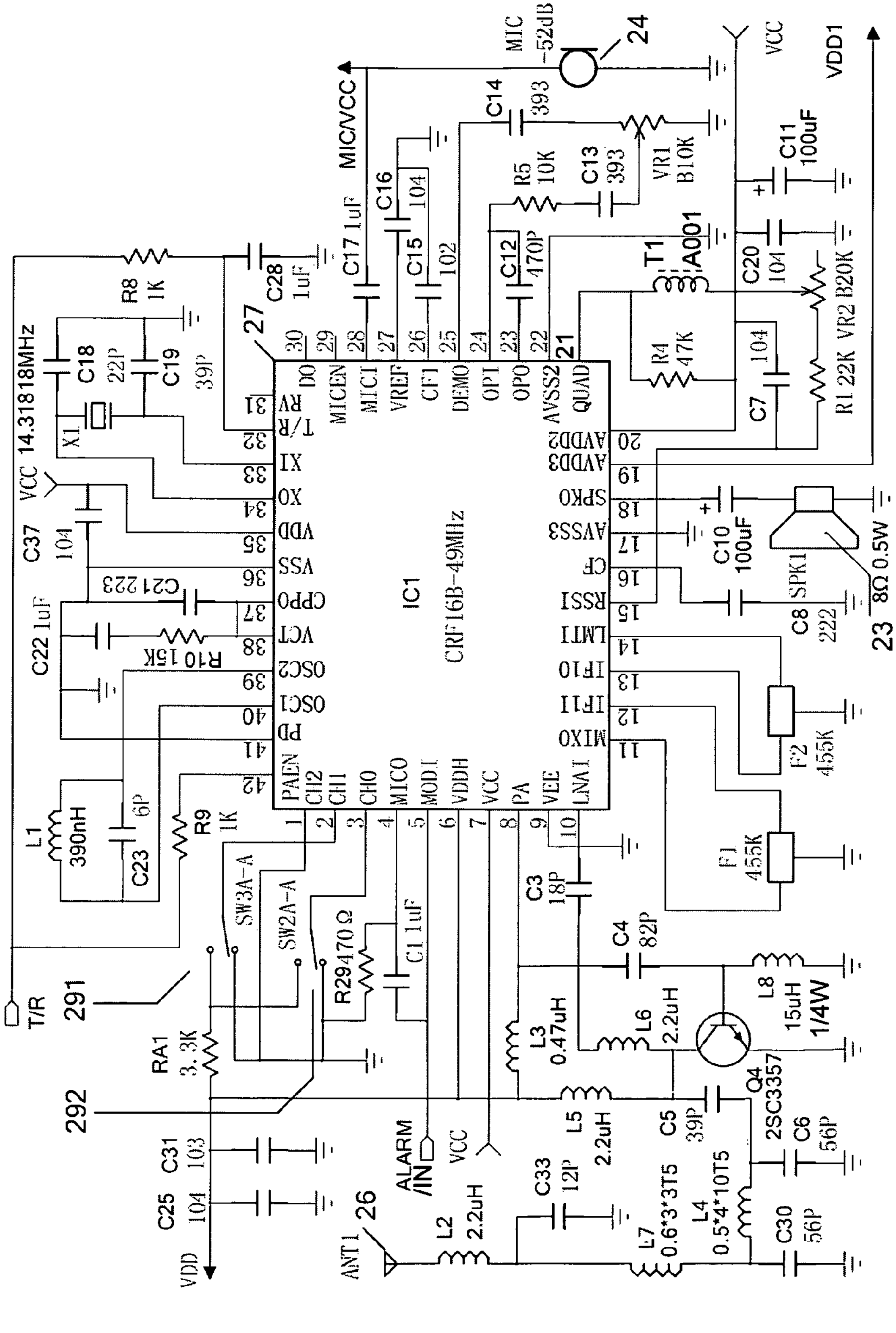
FIG. 6 is a circuit diagram of the indoor bell of the present invention.
Figure 6B:
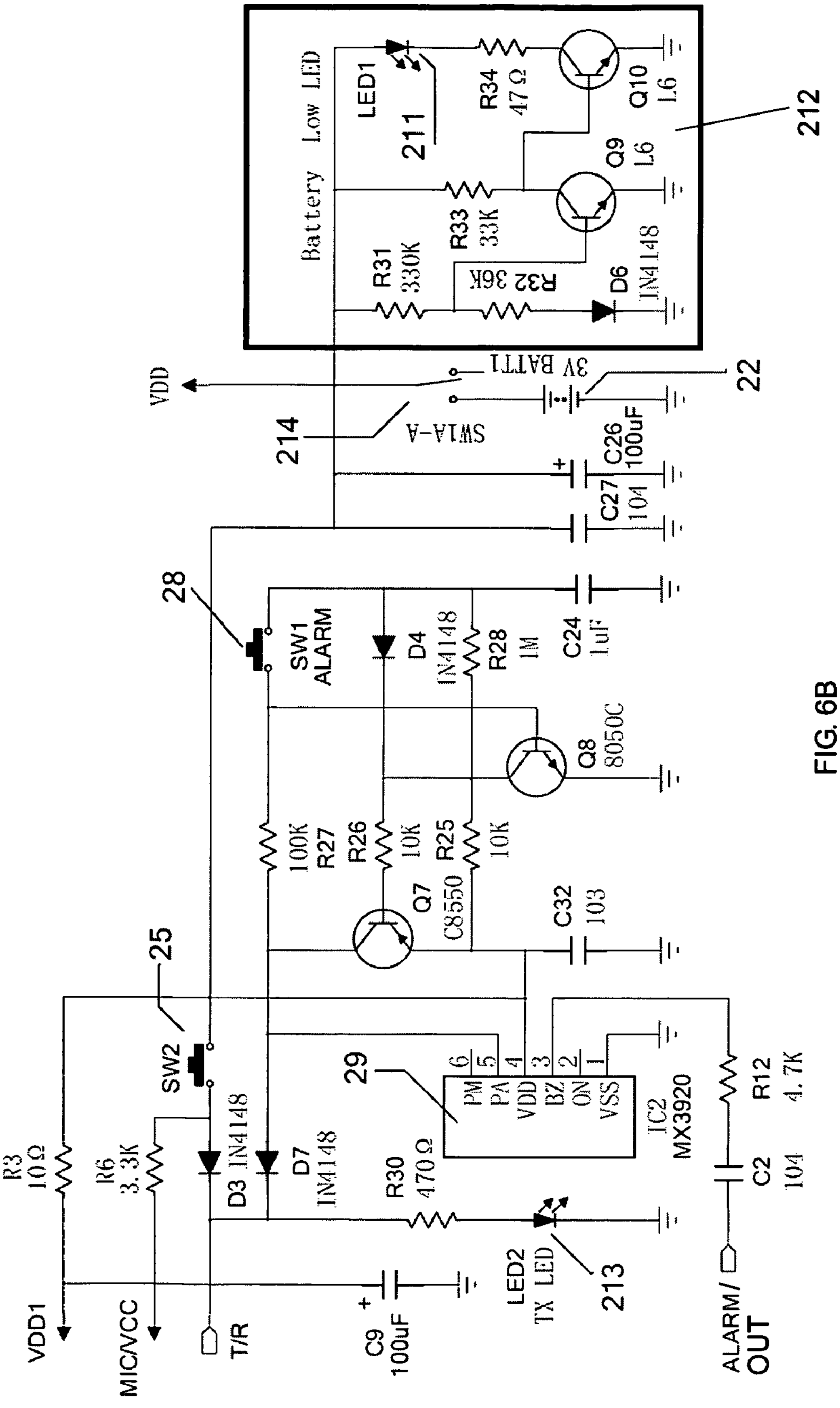

As shown in FIGS. 4 to 6, the indoor bell 2 comprises an indoor bell casing 21, an indoor bell power supply 22, an indoor bell loudspeaker 23, an indoor bell microphone 24, an indoor bell talk button 25, an indoor bell antenna 26, an indoor bell wireless transmitting and receiving integrated circuit 27 and a door ring integrated circuit 29. In the present embodiment, the indoor bell further comprises an alarm button 28, the indoor bell wireless transmitting and receiving integrated circuit 27 electrically connects with the indoor bell power supply 22, the indoor bell loudspeaker 23, the indoor bell microphone 24, the indoor bell talk button 25, the indoor bell antenna 26, the alarm button 28 and the door ring integrated circuit 29. When the alarm button 28 is pressed, the indoor bell wireless transmitting and receiving integrated circuit 27 transmits an alarming signal by the indoor bell antenna 26, the outdoor bell wireless transmitting and receiving integrated circuit 17 receives the alarming signal via the outdoor bell antenna 16 and then drives the outdoor bell loudspeaker 13 to ring a preset alarm. The indoor bell 2 further comprises an indoor bell operation indicating light 213 and a power switch 214. The indoor bell 2 further comprises an indoor first channel set button 291 and an indoor second channel set button 292. The indoor first channel set button 291 and the indoor second channel set button 292 electrically connects with the indoor bell wireless transmitting and receiving integrated circuit 27. The indoor bell wireless transmitting and receiving integrated circuit 27 adjusts the frequency range for receiving and transmitting signals according to the on/off combination of the indoor first channel set button 291 and the indoor second channel set button 292.

As shown in FIGS. 3 and 6, the model numbers of the outdoor bell wireless transmitting and receiving integrated circuit 17 and the indoor bell wireless transmitting and receiving integrated circuit 27 are each CRF16B. The model numbers of the door ring integrated circuit 19 of the outdoor bell 1 and the door ring integrated circuit 29 of the indoor bell 2 are each MX3920.

As shown in FIGS. 1, 3, 4 and 6, the outdoor bell 1 further comprises an outdoor bell power supply low voltage indicating light 111 and a power supply low voltage detecting circuit 112, the indoor bell 2 further comprises an indoor bell power supply low voltage indicating light 211 and a power supply low voltage detecting circuit 212. When the power supply low voltage detecting circuit 111 of the outdoor bell 1 detects that the voltage drops to a predetermined level, the predetermined level is 2.4V in the present embodiment, the outdoor bell power supply low voltage indicating light 111 gives light reminding the user to change the batteries. When the power supply low voltage detecting circuit 212 of the indoor bell 2 detects that the voltage drops to a predetermined level, the predetermined level is 2.4V in the present embodiment, the indoor bell power supply low voltage indicating light 211 gives light reminding the user to change the batteries.

As shown in FIGS. 1, 3, 4 and 6, when the outdoor bell talk button 15 is being pressed, the outdoor bell operation indicating light 113 keeps on giving light; when the door bell 18 is pressed for one time, the outdoor bell operation indicating light 113 flashes three times. When the indoor bell talk button 25 is being pressed, the indoor bell operation indicating light 213 keeps on giving light; when the alarm button 28 is pressed once while the indoor bell operation indicating light 213 keeps on giving light, the indoor bell operation indicating light 213 stops giving light.

As shown in FIGS. 2, 3, 5 and 6, the outdoor bell 1 further comprises a power switch 114, the indoor bell 2 further comprises a power switch 214. When the outdoor bell 1 is in operation, the power switch 114 is adjusted to an "ON" position, when the outdoor bell 1 is not in operation, the power switch 114 is adjusted to an "OFF" position. When the indoor bell 2 is in operation, the power switch 214 is adjusted to an "ON" position, when the indoor bell 2 is not in operation, the power switch 214 is adjusted to an "OFF" position.

To use the wireless intercommunicative and door bell function, when the outdoor bell talk button 15 or the door ring button 18 of the outdoor bell is pressed, the outdoor bell wireless transmitting and receiving integrated circuit 17 modulates the signals received by the outdoor bell microphone 14 or the door ring signals generated by the door ring integrated circuit 19 of the outdoor bell, and the signals are then transmitted by the outdoor bell antenna 16, the indoor bell wireless transmitting and receiving integrated circuit 27 receives and decodes the signals transmitted by the outdoor bell antenna 16 via the indoor bell antenna 26, and the decoded signals are outputted via the indoor bell loudspeaker 23; when the indoor bell talk button 25 is pressed, the indoor bell wireless transmitting and receiving integrated circuit 27 modulates the signals received by the indoor bell microphone 24 and the signals are then transmitted by the indoor bell antenna 26, the outdoor bell wireless transmitting and receiving integrated circuit 17 receives and decodes the signals transmitted by the indoor bell antenna 26 via the outdoor bell antenna 16, and the decoded signals are outputted via the outdoor bell loudspeaker 13. The present invention provides an alarm which is easy for the person indoor to operate and can effectively call for attention on the basis of a wireless intercommunicative doorbell. It provides the solution of a single wireless intercommunicative alarm doorbell with the dual functions.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A wireless intercommunicative alarm doorbell comprising:

an outdoor bell and an indoor bell;

the outdoor bell comprises an outdoor bell casing, an outdoor bell power supply, an outdoor bell loudspeaker, an outdoor bell microphone, an outdoor bell talk button, an outdoor bell antenna, an outdoor bell wireless transmitting and receiving integrated circuit, a door ring button and a door ring integrated circuit;

the outdoor bell wireless transmitting and receiving integrated circuit electrically connects with the outdoor bell power supply, the outdoor bell loudspeaker, the outdoor bell microphone, the outdoor bell talk button, the outdoor bell antenna, the door ring button and the door ring integrated circuit;

the indoor bell comprises an indoor bell casing, an indoor bell power supply, an indoor bell loudspeaker, an indoor bell microphone, an indoor bell talk button, an indoor bell antenna, an indoor bell wireless transmitting and receiving integrated circuit and a door ring integrated circuit;

the indoor bell wireless transmitting and receiving integrated circuit electrically connects with the indoor bell power supply, the indoor bell loudspeaker, the indoor bell microphone, the indoor bell talk button, the indoor bell antenna and the door ring integrated circuit;

when the outdoor bell talk button or the door ring button of the outdoor bell is pressed, the outdoor bell wireless transmitting and receiving integrated circuit modulates the signals received by the outdoor bell microphone or the door ring signals generated by the door ring integrated circuit of the outdoor bell, and the signals are then transmitted by the outdoor bell antenna, the indoor bell wireless transmitting and receiving integrated circuit receives and decodes the signals transmitted by the outdoor bell antenna via the indoor bell antenna, and the decoded signals are outputted via the indoor bell loudspeaker;

when the indoor bell talk button is pressed, the indoor bell wireless transmitting and receiving integrated circuit modulates the signals received by the indoor bell microphone and the signals are then transmitted by the indoor bell antenna, the outdoor bell wireless transmitting and receiving integrated circuit receives and decodes the signals transmitted by the indoor bell antenna via the outdoor bell antenna, and the decoded signals are outputted via the outdoor bell loudspeaker;

wherein the indoor bell further comprises an alarm button, the alarm button electrically connects with the indoor bell wireless transmitting and receiving integrated circuit and the door ring integrated circuit of the indoor bell; when the alarm button is pressed, the indoor bell wireless transmitting and receiving integrated circuit modulates the door ring signals generated by the door ring integrated circuit of the indoor bell and then transmits an alarming signal by the indoor bell antenna, the outdoor bell wireless transmitting and receiving integrated circuit receives the alarming signal via the outdoor bell antenna and then drives the outdoor bell loudspeaker to ring a preset alarm.

2. The wireless intercommunicative alarm doorbell as in claim 1, wherein the model numbers of the outdoor bell wireless transmitting and receiving integrated circuit and the indoor bell wireless transmitting and receiving integrated circuit are each CRF16B.

3. The wireless intercommunicative alarm doorbell as in claim 1, wherein the model numbers of the door ring integrated circuits of the outdoor bell and the indoor bell are each MX3920.

4. The wireless intercommunicative alarm doorbell as in claim 1, wherein the outdoor bell further comprises an outdoor first channel set button and an outdoor second channel set button, the outdoor first channel set button and the outdoor second channel set button electrically connects with the outdoor bell wireless transmitting and receiving integrated circuit, the outdoor bell wireless transmitting and receiving integrated circuit adjusts the frequency range for receiving and transmitting signals according to the on/off combination of the outdoor first channel set button and the outdoor second channel set button.

5. The wireless intercommunicative alarm doorbell as in claim 1, wherein the indoor bell further comprises an indoor first channel set button and an indoor second channel set button, the indoor first channel set button and the indoor second channel set button electrically connects with the indoor bell wireless transmitting and receiving integrated circuit, the indoor bell wireless transmitting and receiving integrated circuit adjusts the frequency range for receiving and transmitting signals according to the on/off combination of the indoor first channel set button and the indoor second channel set button.

6. The wireless intercommunicative alarm doorbell as in claim 1, wherein the outdoor bell further comprises an outdoor bell power supply low voltage indicating light and a power supply low voltage detecting circuit, the indoor bell further comprises an indoor bell power supply low voltage indicating light and a power supply low voltage detecting circuit.

7. The wireless intercommunicative alarm doorbell as in claim 1, wherein the outdoor bell further comprises an outdoor bell operation indicating light.

8. The wireless intercommunicative alarm doorbell as in claim 1, wherein the indoor bell further comprises an indoor bell operation indicating light.

9. The wireless intercommunicative alarm doorbell as in claim 1, wherein the outdoor bell further comprises a power switch; the indoor bell further comprises a power switch.

10. The wireless intercommunicative alarm doorbell as in claim 1, wherein the outdoor bell power supply and the indoor bell power supply are each two 2A batteries respectively.

* * * * *